United States Patent [19]
Hasegawa et al.

[11] Patent Number: 4,691,261
[45] Date of Patent: Sep. 1, 1987

[54] CHANNEL CHANGING MECHANISM IN A TAPE PLAYER

[75] Inventors: Isao Hasegawa; Kikuo Yoshikawa; Satoshi Takagi, all of Tokyo; Akira Takahashi, Nagoya, all of Japan

[73] Assignee: Clarion Co., Ltd., Tokyo, Japan

[21] Appl. No.: 675,509

[22] Filed: Nov. 28, 1984

[30] Foreign Application Priority Data

Dec. 2, 1983 [JP] Japan .................................. 58-227029
Dec. 13, 1983 [JP] Japan .................................. 58-233637

[51] Int. Cl.⁴ ........................ G11B 15/02; G11B 15/24
[52] U.S. Cl. ..................................... 360/137; 360/96.2
[58] Field of Search .............. 360/137, 96.2; 242/201; 226/181

[56] References Cited
U.S. PATENT DOCUMENTS 4,504,877 3/1985 Tsuchiya ............................ 360/96.2
4,564,873 1/1986 Hashimoto et al. ............... 360/96.2

Primary Examiner—Robert S. Tupper
Attorney, Agent, or Firm—Flynn, Thiel, Boutell & Tanis

[57] ABSTRACT

A channel changing mechanism in a tape player includes a pinch roller change plate for alternatively bringing a pair of pinch rollers to and apart from a pair of capstan shafts, and a power plate movable to its forward-mode, reverse-mode and neutral positions responsively to the pinch roller change plate and a power gear engageable with the power plate and formed with two chipped portions along its geared circumference to be opposed to a motor-driven gear when the power gear is locked. The power plate is locked at the forward-mode or reverse-mode position with a delay corresponding to a half revolution of the power gear after the source power is supplied to the tape player.

2 Claims, 10 Drawing Figures

CHANNEL CHANGING MECHANISM IN A TAPE PLAYER

FIELD OF THE INVENTION

This invention relates to a channel changing mechanism in a tape player, and more particularly to a driving system to drive the channel changing mechanism of a type which changes channels of a tape by driving a power plate responsively to rotation of a power gear driven by a motor.

BACKGROUND OF THE INVENTION

Pinch rollers forcibly contacted to capstan shafts during tape feeding must be detached therefrom upon interruption of the power supply so as to avoid their deformation or shortening of life.

The prior art method of this detachment is to couple pinch rollers to a head plate with a head thereon, so that the head plate which retracts upon power supply interruption conveys the capstans. This method, however, requires a complicated construction, because the head plate must be carried back to the advanced position, which requires a mechanism to move the head plate back and forth responsively to removal and supply of the power to the system. Considering that the head plate must be moved back and forth to place the tape player in the fast-forwarding or rewinding mode or upon loading or ejection of a tape, the construction to also move it back and forth upon interruption and supply of the source power invites a complicated arrangement of a control means.

A tape player in general includes a channel changing mechanism to change the tape feeding direction from forward to reverse or vice versa.

The channel changing mechanism is configured to alternatively compress or detach right and left pinch rollers with respect to capstan shafts by displacement of a pinch roller change plate which is operatively linked to a driving device driven by a motor. The pinch roller change plate has forward- and reverse-mode cams which engage the right and left pinch rollers, respectively. The cams are configured to compress one of the pinch rollers to the associated capstan and detach the other pinch roller from the other capstan when the pinch roller change plate is locked at its rightmost or leftmost position.

The present inventor proposed a mechanism to detach the pinch rollers from the capstan shafts, without moving the head plate, in order to eliminate the above-described drawbacks caused by frequent displacements of the head plate. More specifically, the inventor's proposal was to use a resilient member such as a spring to bring back the pinch roller change plate to its neutral position where the both pinch rollers stand apart from the capstan shafts, when the power supply is interrupted. Thus, the head plate need not displace upon interruption of the power supply. This significantly simplified the construction and the control means, and also contributed to a further reduction of the overall size of the tape player.

However, if the channel changing mechanism is configured so that the pinch roller change plate is moved by a power plate which is in turn moved by rotation of a power gear driven by a motor, the inventor's proposal still involves the following problem.

In such a channel changing mechanism, the power gear has two, forward- and reverse-mode chipped portions along the geared circumference, so that, during a play mode, the power gear is locked at an angular position where one of the chipped portions faces a drive means and the power gear is detached from the motor so as not to change the channels of the tape. A change of the channels is effected by a reciprocation of the power plate when the power gear is unlocked, is rotated by a half revolution by the motor power, and is locked again at an angular position where the other chipped portion faces the drive means. When the pinch roller change plate is returned to its neutral position by the spring force upon interruption of the power supply, the power plate operatively linked thereto also returns to its neutral position. Concurrently, the power gear is going to rotate together. However, to allow the power gear to rotate, it is necessary to unlock it and forcibly rotate the motor which is in response in engagement with the motor-driven gear, thereby applying a load to the motor and relevant mechanisms. The load, in turn, becomes a resistance against movements of the power plate and the pinch roller change plate. Therefore, the spring force to return them to their neutral positions must be significantly large, and the driving force to move the plates against the large resilient force must be also large, accordingly.

The channel changing mechanism moves the pinch roller change plate from the forward- to reverse-mode position or vice versa, as explained above. If the power plate returns to its neutral position when the power supply is removed as described above, the pinch roller change plate cannot return to its preceding position unless the power plate is returned to its former position by the power gear. However, since the power gear is locked every half revolution to lock the power plate at the forward- or reverse-mode position in the prior art mechanism, it is inevitable that when the power is supplied, the power gear is locked after a half revolution and locks the power plate at a position opposite to that before the preceding interruption. This means that the channel is changed from one to the other every time when the power switch is turned on. Therefore, a user is compelled to make an additional channel changing operation after a power-in to the player, in order to feed the tape in the same direction as that before the preceding power-off of the player.

Besides this, in a tape player in general, a tape in position is liable to produce a slack when the tape player is first activated after the tape is loaded in position or the tape player is activated again after the power supply is once cut off or when the tape player is placed in the tape playing mode from the fast-forwarding or rewinding mode. If the tape is driven as it is, the slack is often eated between the pinch roller and the capstan and accumulates thereon, thereby causing a sudden interruption of the tape player or a serious damage to the tape. In this connection, many tape players are configured to remove such a tape slack by rotating a take-up reel base in a slight time after the take up reel base begins to rotate due to engagement with the idler gear and before the pinch roller is compressed to the capstan shaft.

The prior art tape slack removing mechanism described above, however, involves the following drawbacks.

In a slight time for removal of the tape slack, it is only the take-up reel base that rotates due to engagement with the idler gear. Therefore, as the result of the tape slack removal, a so-called tape run, wherein the tape is fed ahead, occurs. Such a tape run is infavourable because the player fails to play a significant part of the tape when the tape slack is large and because an abnormal sound is produced due to a high velocity.

A proposal to overcome this problem is to employ a lock mechanism which locks the take-up reel base by friction produced between the reel base and an elastic member encircling the circumference of the reel base. However, provision of such a mechanism unique to the locking of the reel base makes the tape player construction extremely complicated and large-scaled.

OBJECT OF THE INVENTION

It is therefore an object of the invention to provide a channel changing mechanism in a tape player which mechanism is capable of smoothly moving various members and thereby bringing the pinch rollers to and away from the capstans, without applying any load to the motor, and capable of maintaining the preceding channel of the tape and hence the preceding tape travelling direction, upon activation of the tape player.

Another object of the invention is to provide a tape player which is capable of removing a tape slack without producing a tape run and which is significantly small-scaled and simplified as compared to the prior art tape player having this function.

SUMMARY OF THE INVENTION

In accordance with the present invention, there is provided a channel changing mechanism in a tape player comprising:

a pinch roller change plate for alternatively bringing a pair of pinch rollers to and away from a pair of capstan shafts;

a power plate operatively linked to said pinch roller change plate to take its forward-mode, reverse-mode and neutral positions;

means for locking said power plate at said forward-mode or reverse-mode position when the source power is supplied to the tape player;

a gear mounted on said power plate and driven by a motor of the tape player;

a power gear mounted on said power plate and having two chipped portions along the geared circumference thereof so as to be intermittently engaged and rotated by said gear;

first engagement means formed in power plate to engage said power plate with said power gear for establishing reciprocation of said power plate;

resilient means biasing said power gear in its rotatable direction;

a lock link for locking said power gear at an angular position whereat one of said chipped portions is opposed to said motor-driven gear;

said first engagement means having a release portion to decouple said power plate from said power gear when the power supply is cut off, said power plate having formed a pushing portion for pushing said lock link in a direction to unlock said power gear when said power plate takes its neutral position; and said lock means being configured to delay its action to lock said power plate by a time corresponding to about a half revolution of said power gear after a power-in to the tape player.

The second object of the invention is achieved by adding to the above construction:

forward-drive and reverse-drive reel bases;

two idler gears each engageable with and driving said respective reel base;

second engagement means forward in said power plate;

said second engagement means being configured so that it does not engage either of said idler gears when said power plate takes said neutral position, and it engages one of said idler gears in engagement with said forward-drive or reverse-drive reel base and detaches said idler gear from said reel base when said power plate takes said forward-mode or reverse-mode position.

The invention will be better understood from the description given below, referring to preferred embodiments illustrated in the drawings.

BRIEF DESCRIPTION OF THE DRAWINGS

FIGS. 1 through 8 are plan views of a channel changing mechanism embodying the invention, in which:

FIG. 1 shows the forward tape driving mode;

FIG. 2 shows the mechanism in the course of changes from the forward-drive mode to the stop mode due to interruption of the power supply;

FIG. 3 shows the mechanism upon completion of the changes of FIG. 2;

FIG. 4 shows the mechanism in the course of channel changing operation;

FIG. 5 shows the mechanism upon completion of movement and locking at the reverse-mode positions;

FIGS. 6 through 8 stepwise show changes due to a power-on of the tape player;

FIGS. 9 through 10 are plan views of a tape slack removing mechanism embodying the invention, in which:

FIG. 9 shows the mechanism when the power supply is cut off and when the tape player is activated; and FIG. 10 shows the mechanism locked at the forward-mode position.

DETAILED DESCRIPTION OF THE PREFERRED EMBODIMENT

Figure 1:
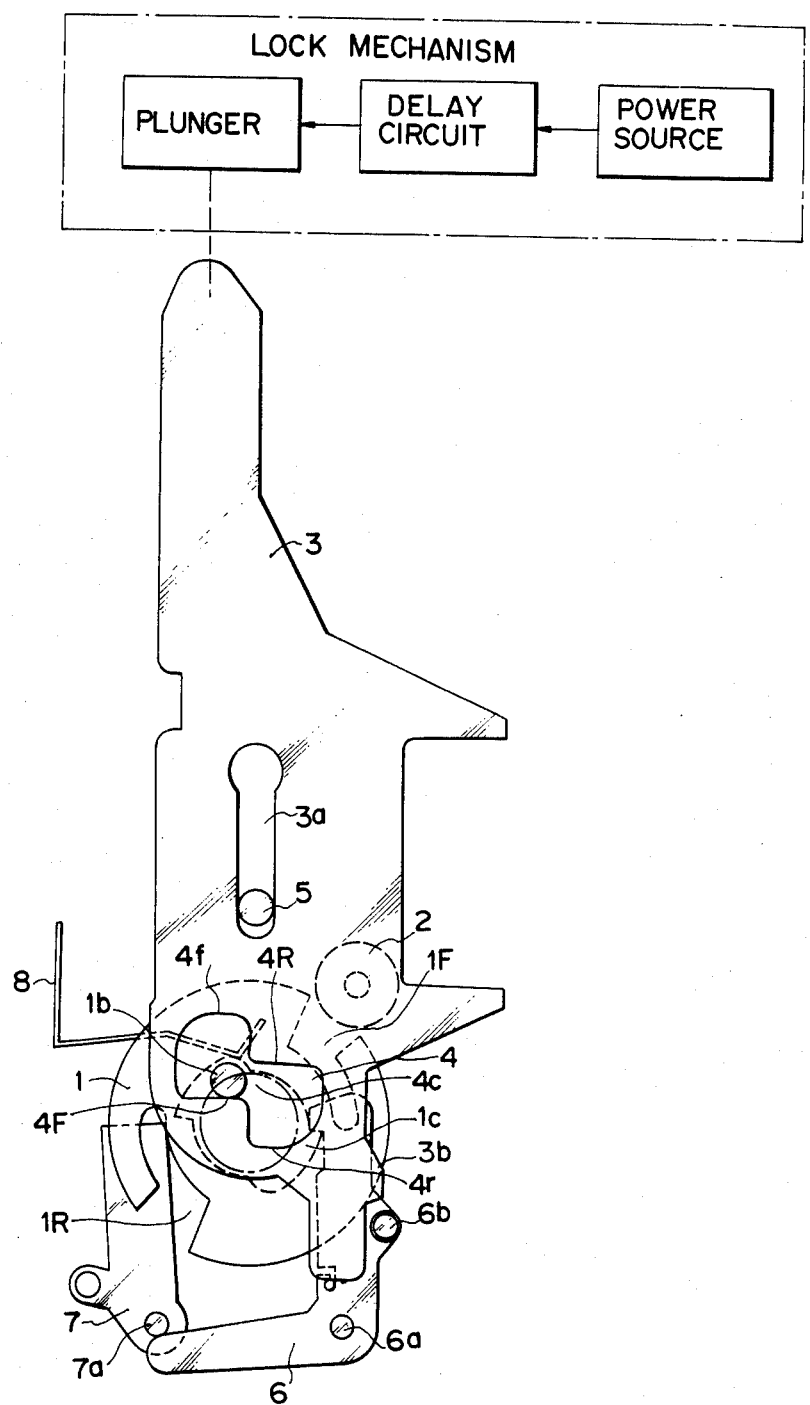

Referring to FIG. 1, a power gear 1 has a geared circumference engageable with a gear 2 driven by a motor (not shown). The geared circumference is partly broken at two, forward- and reverse-mode chipped portions 1F and 1R. The power-gear 1 carries thereon a roller 1b engaging a contorted hole 4 of a power plate 3 to provide an operative linkage between the power gear 1 and the power plate 3. The power plate 3 is also provided with an elongated hole 3a which slidably engages a pin 5 immovably fixed to a frame of the tape player. The power plate 3 is connected to a pinch roller change plate of a channel changing mechanism via a member not shown. The contorted hole 4 has a configuration made by two corner-trimmed quadrangles united symmetrically at one corner portions thereof. The resultant contorted hole 4 is defined by forward- and reverse-mode engaging edges 4F and 4R and forward- and reverse-mode release portions 4f and 4r. The center 4c between the two quadrangles is wide enough to let the roller 1b pass therethrough.

The power gear 1 has formed at the back face thereof a cam 1c which includes symmetrical recesses along the circumference thereof. At both sides of the cam 1c are disposed a lock link 6 pivotable about an axle 6a and a sublock link 7 pivotable about an axle 7a, so as to engage the recesses of the cam 1c and lock the power gear 1 unrotatable. The lock link 6 has a pin 6b which is engaged and rotated clockwise by a pushing edge 3b of the power plate 3 when the latter is out of its rightmost or leftmost locked position, so that the lock gear 6 unlocks the power gear 1. The sublock link 7 is normally maintained at a position not engageable with the recess of the cam 1c, and locks it only during a channel changing operation.

The lock link 6 and the sub-lock link 7 are biased by springs not shown toward the power gear 1. The cam 1c of the power gear 1 is biased by a plate spring 8 toward its rotating direction.

The driving system of a channel changing mechanism having the above-described construction operates as follows:

(1) Forward Travel Mode (FIG. 1):

When a tape travels forward, the forward-mode chipped portion 1F of the power gear faces the gear 2 as shown in FIG. 1, and the power gear 1 stops at a position decoupled from the motor. The power plate 3 is locked at its forward-mode position together with a pinch roller change plate by an electromagnetic plunger (not shown). Therefore, a forward-drive pinch roller is in pressure contact with an associated capstan. The power gear 1 is locked, with its roller 1b engaging the forward-mode engaging edge 4F and with the recess of the cam 1c engaging the lock link 6. The engagement between the lock link 6 and the cam 1c is effected by the energy of the spring (not shown), because the power plate 3 is at the forward-mode position, and the pushing edge 3b never pushes the pin 6b of the lock link 6 against the energy of the spring. Although the cam 1c is energized by the plate spring 8 in its rotatable direction, its rotation is prevented by the lock link 6. The sub-lock link 7 is out of engagement with the cam 1c, as described above.

Figure 2:
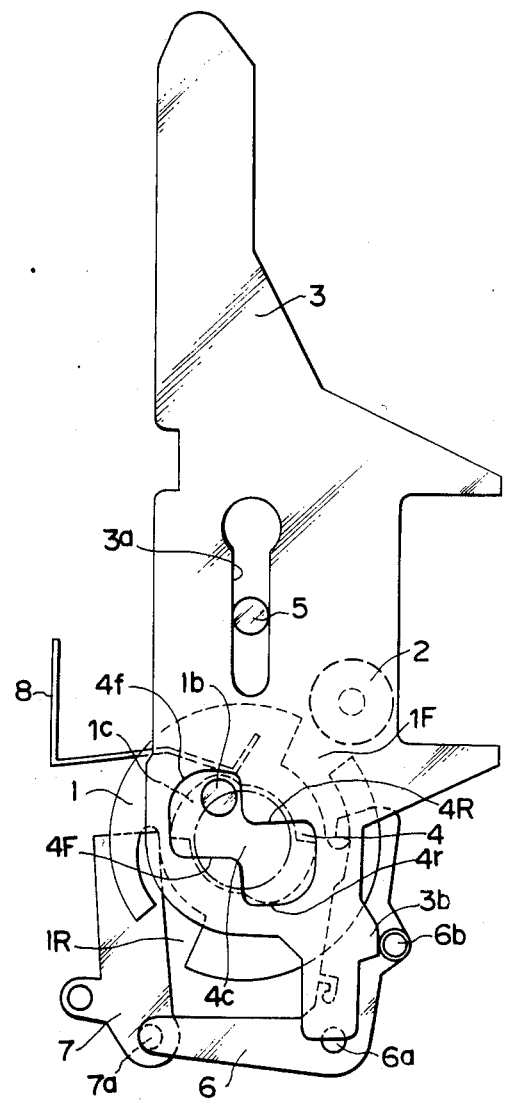
Figure 3:
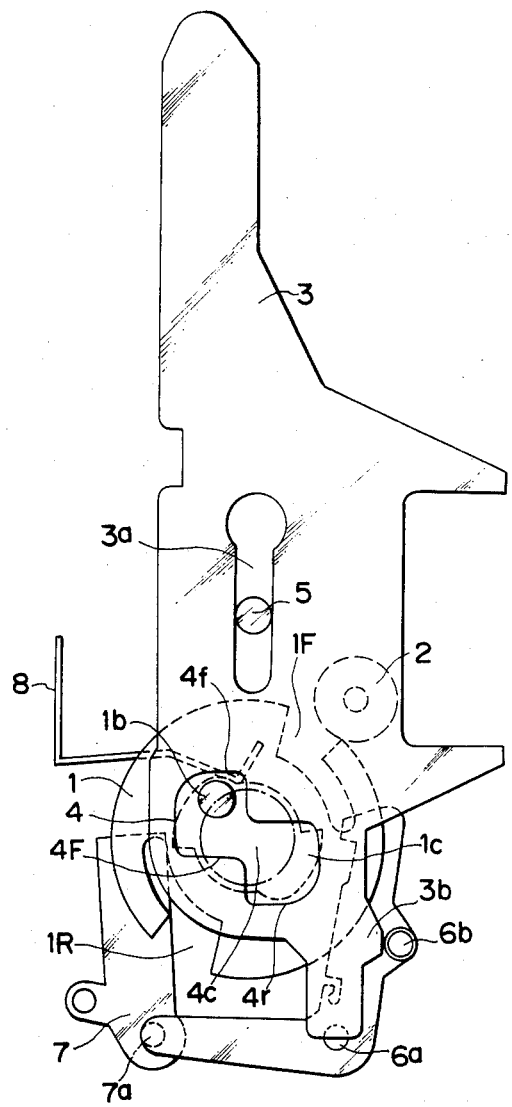

(2) Removal of Source Power (FIGS. 2 and 3):

When the power supply is interrupted in the system in the forward travel mode of FIG. 1, the pinch roller change plate returns to its neutral, central position and detaches the pinch roller from the capstan. At the same time, the power plate 3 operatively linked to the pinch roller change plate returns to its central position as shown in FIG. 2. As the result, the pushing edge 3b of the power plate 3 pushes and rotates the lock link 6 so as to unlock the power gear 1. The displacement of the power plate 3 changes the relative position of the roller 1b from the forward-mode engaging edge 4F to the forward-mode release position 4f, but does not rotate the power gear 1. It is the energy applied to the cam 1c by the plate spring 8 that slightly rotates the unlocked power gear 1 to a position engageable with the gear 2 as shown in FIG. 3. This means that the power gear 1 and the power plate 3 are disengaged from each other when the power supply is interrupted. Therefore, smooth displacements of various members are effected, without giving a load to the motor.

(3) Channel Changing Operation (FIGS. 4 and 5):

With the above-described construction only, the system erroneously changes the tape channel when the power source is applied again.

Figure 4:
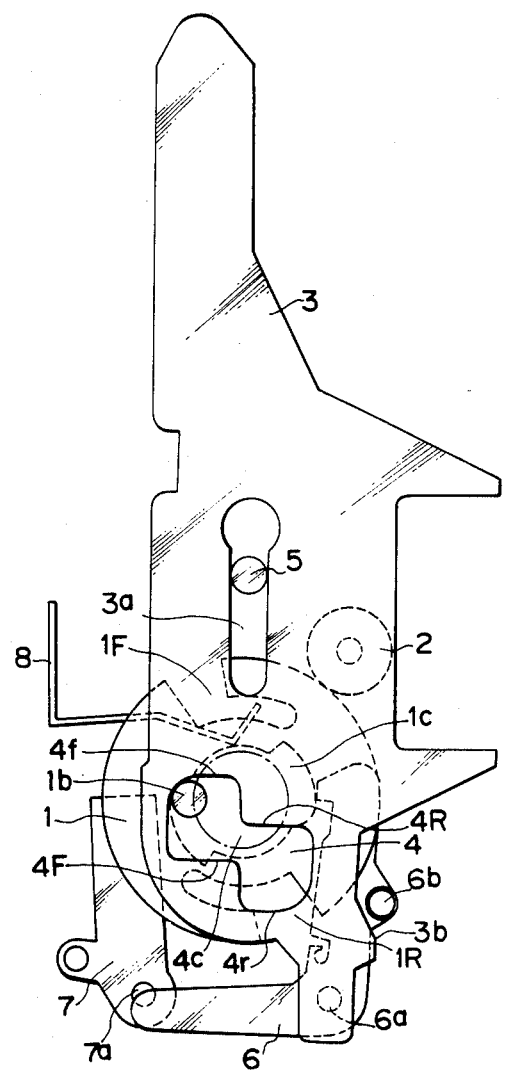
Figure 5:
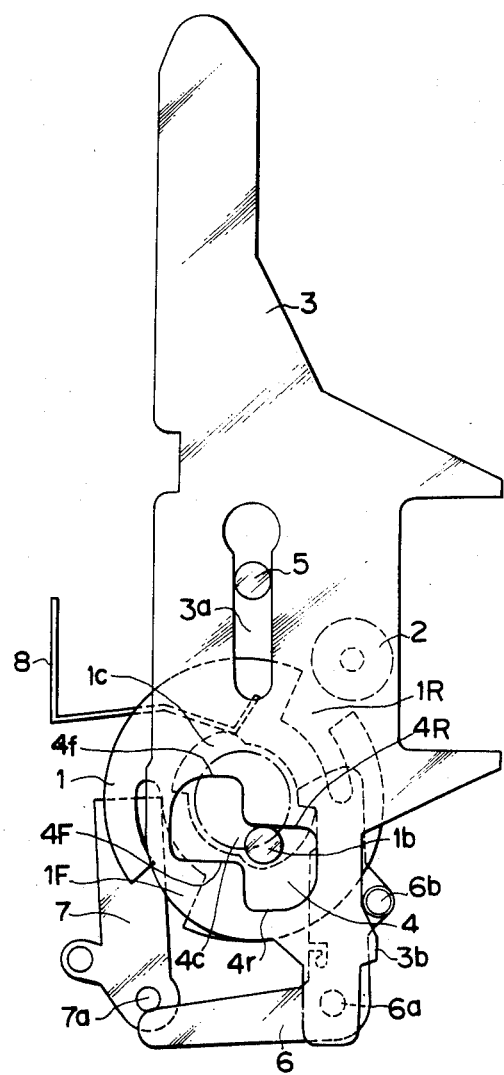

More specifically, assuming that the power source is applied to the system in the positional relationships as shown in FIG. 3, the power gear 1 engaging the motor-driven gear 2 starts rotating from its forward-mode position to its reverse-mode position. Along this, the pinch-roller change plate and the power plate 3 start moving to their reverse-mode positions. After the power plate 3 reaches the reverse-mode position as shown in FIG. 4 whereat it is locked by an electromagnetic plunger (not shown) then energized, the power gear 1 further rotates to its reverse-mode position as shown in FIG. 5 and is locked there. During this displacement, the roller 1b changes its position within the contorted hole 4, from the forward-mode quadrangle, through the central path 4c, to the reverse-mode quadrangle, and is locked by the reverse-mode engaging edge 4R. As the result, the pushing edge 3b of the power plate withdraws from the pin 6b of the lock link 6 which in turn is permitted to rotate with the energy of a spring and engages the cam 1c so as to lock the power gear 1.

A normal intended channel change is effected, without interrupting the power supply, by rotating the lock link 6 responsively to a manual channel changing operation or to a tape-end detection signal to unlock the power gear 1, and engaging the power gear 1 with the motor-driven gear 2.

Figure 6:
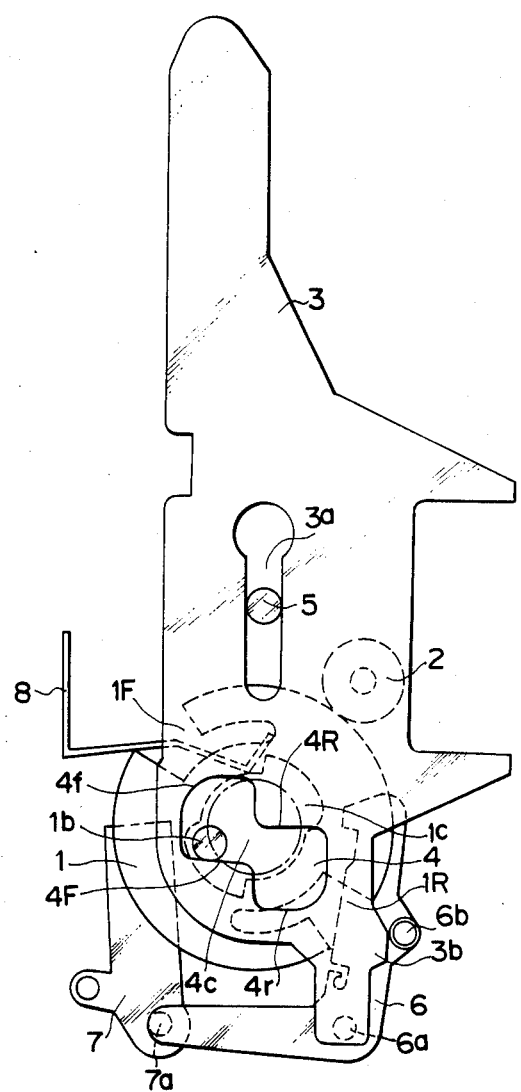

(4) Throw-in of the Power Source (FIGS. 6 through 8):

In order to prevent an undesired channel change upon re-entering the power supply, the invention employs a delay circuit in a lock mechanism including a known electromagnetic plunger, to delay the locking of the power plate 3 by the time corresponding to the half revolution of the power gear 1. It should be noted that the lock mechanism indirectly acts on the power plate via the pinch-roller change plate if the power plate is operatively linked to the pinch-roller change plate, and that this is known in the art.

The power supply is thrown in to the system in the state of FIG. 3, the power gear 1 starts rotating from the forward-mode position to the reverse-mode position. However, the power plate 3 is not attracted immediately by the electromagnetic plunger because the delay circuit is provided. Therefore, while the pinch-roller change plate and the power plate 3 remain immovable, the power gear 1 only rotates until the roller 1b reaches the forward-mode engaging edge 4F. Thereafter, as the roller 1b pushes the engaging edge 4F, the power plate 3 is moved to its reverse-mode position.

Figure 7:
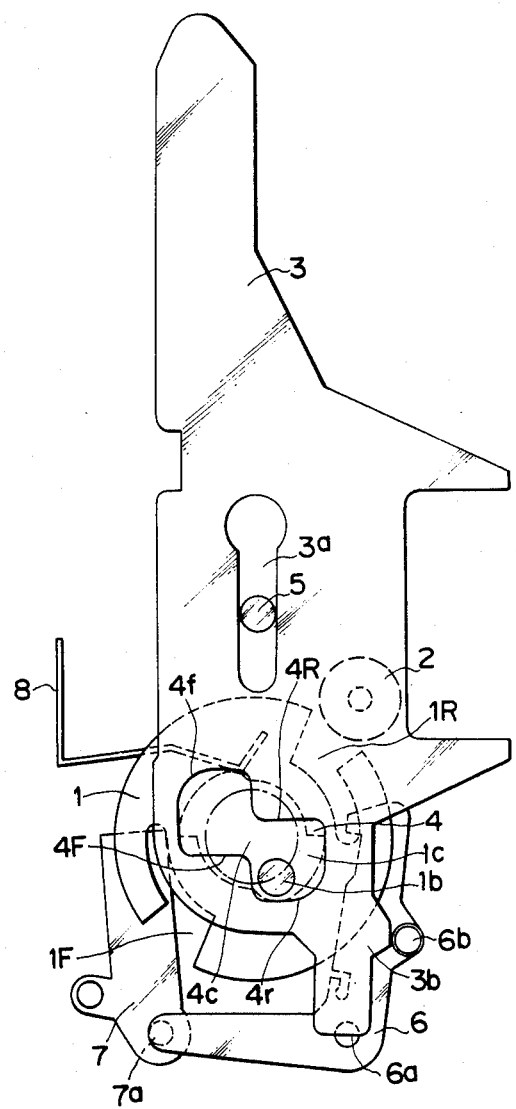

As the power gear 1 further rotates until the reverse-mode chipped portion 1R thereof faces the motor-driven gear 2, the roller 1b changes its position through the central path 4c to the reverse-mode engaging edge 4R. At this stage, however, the power plate 3 returns to its central position as shown in FIG. 7, because the electromagnetic plunger does not yet attract it. The electromagnetic plunger is energized and begins the attraction only after the power gear 1 reengages the motor-driven gear 2 after a half revolution commenced by the energy of the plate spring 8. Thus the pinch-roller change plate and the power plate 3 start moving to their forward-mode positions responsively to the rotation of the power gear 1 toward its forward-mode position.

Figure 8:
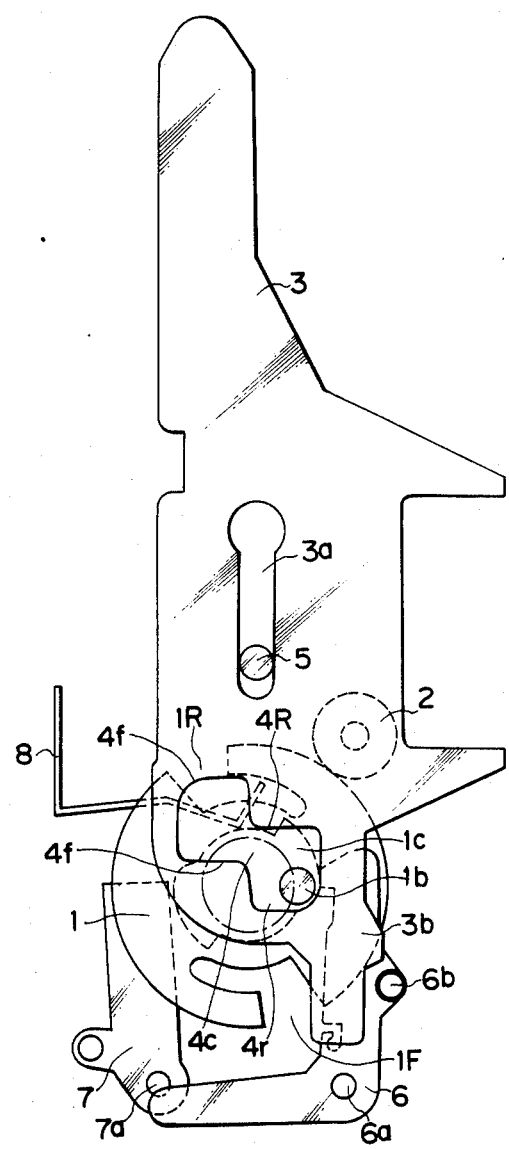

After the power plate 3 is locked at the forward-mode position as shown in FIG. 8, the power gear 1 further rotates until it is locked immovable at the forward-mode position of FIG. 1. Concurrently, the roller 1b moves within the contorted hole 4 from the reverse-mode quadrangle, through the central path 4c, to the forward-mode engaging edge 4F, and is locked there. Since the power plate 3 has been locked at the forward-mode position, the pushing edge 3b thereof is spaced from the pin 6b, so that the lock link 6 is allowed to rotate with the energy of the spring (not shown) and engage the recess of the cam 1c, thus locking the power gear 1.

Thus since the locking of the power plate is delayed, the power gear is not locked until it rotates to its original position. Therefore, the mechanism never changes the tape channel only by a throwover of the power source.

The delay means is not restricted to the electrical means described above, but may be a mechanically delaying structure. The lock means to lock the power plate may be an alternative other than the electromagnetic plunger.

Channel change is liable to produce a slack in the tape in use. In this connection, the present invention proposes to also employ a tape slack removing mechanism in a tape player, together with the above-described channel changing mechanism.

Figure 9:
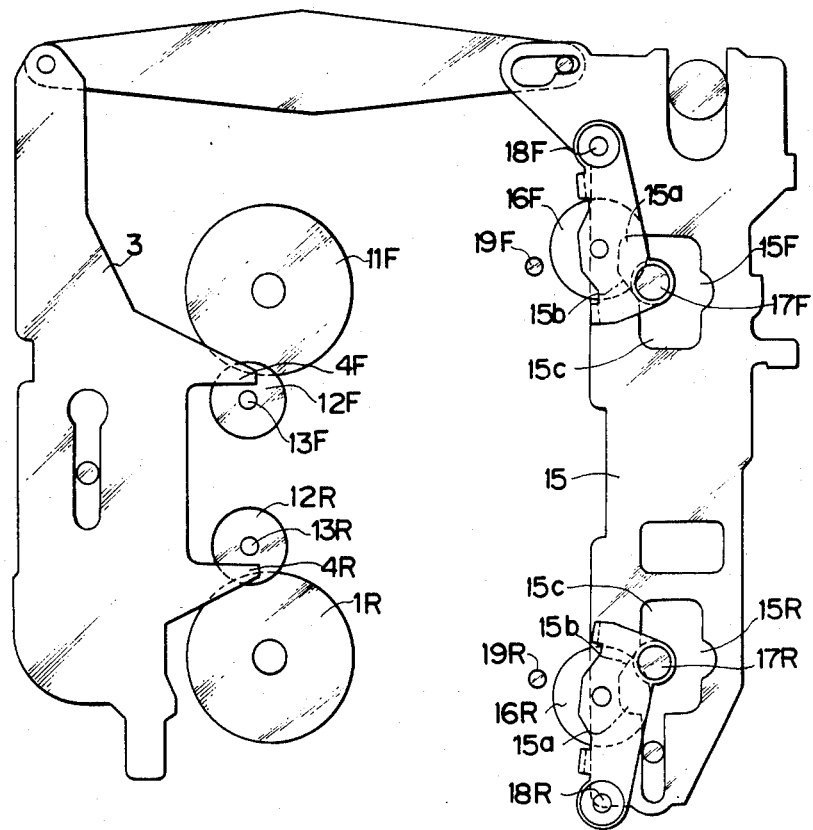

FIG. 9 shows such a tape slack removing mechanism in a tape player. Inside forward- and reverse-drive reel bases 11F and 11R are mounted forward- and reverse-drive idler gears 12F and 12R which are moved to and away therefrom. Springs (not shown) yieldably push the idler gears 12F and 12R into contact with the associated reel bases 11F and 11R. Extensions of axes of the respective idler gears 12F and 12R are pins 13F and 13R. Projections 14F and 14R of the power plate 3 extend across the movement paths of the respective pins 13F and 13R toward the respective associated reel bases 11F and 11R. The projections 14F and 14R are spaced wider than the distance between the pins 13F and 13R when the both idler gears 12F and 12R engage the reel bases 11F and 11R, so that the both projections 14F and 14R are spaced from the both pins 13F and 13R when the power plate takes its neutral position, and so that the distance between one of the projections and the associated pin when the power plate 3 is in the neutral position is smaller than the distance that the power plate 3 is movable from the neutral position to its one utmost end. Thus, as the power plate 3 moves to its forward- or reverse-mode position, one of the projections engages and pushes the associated pin and brings the associated idler gear away from the reel base against the energy of the spring.

A pinch roller change plate 15 is disposed for concurrent but opposite movement to the power plate 3. The plate 15 has formed a pair of cam holes 15F and 15R engaging pins 17F and 17R of pinch rollers 16F and 16R which are rotatably supported by axles 18F and 18R and are biased toward capstan shafts 19F and 19R by springs not shown. Each of the cam holes 15F and 15R includes a pressure contact portion 15a, an angled portion 15b and a detaching portion 15c.

When the pinch roller change plate 15 takes its neutral position, the both pins 17F and 17R are positioned in the angled portion 15b within the cam holes 15F and 15R so that the both pinch rollers 16F and 16R are spaced from the capstan shafts 19F and 19R. When the plate 15 takes its forward- or reverse-mode position, the pin of the relevant pinch roller is positioned in the pressure contact portion 15a to keep the pinch roller in pressure contact with the associated capstan shaft, whereas the pin of the other pinch roller is positioned in the detaching portion 15c to keep the pinch roller apart from the associated capstan shaft. The pinch roller change plate 14 is energized by a spring (not shown) so as to keep its neutral position unless it is moved to or locked at the forward- or reverse-mode position by an electromagnetic plunger.

The slack removing mechanism with the above-construction operates as follows.

Referring to FIG. 9 wherein the source power is not supplied, the pinch roller change plate 15 is not locked at the forward- nor reverse-mode position, and is kept at the neutral position by the spring. The power plate 3 operatively linked to the plate 14 is also maintained in the neutral position. The both pins 17F and 17R are positioned in the angled portions 15b, and the both pinch rollers 16F and 16R are spaced from the capstan shafts 19F and 19R. The both projections 14F and 14R of the power plate 3 stand apart from the pins 13F and 13R, so that the both idler gears 12F and 12R keep the engagement with the reel bases 11F and 11R by the energy of the springs.

When the power source is supplied to the device, the idler gears 12F and 12R are driven so as to rotate the reel bases 11F and 11R in the opposite directions to take up a tape by both reels. Thus a slack of the tape is instantly removed and the tape is tensed between the two tape reels. At that time, no tape run occurs because the tape is pulled concurrently and equally by the both reels. The device never fails to remove a tape slack, without inviting a tape run, when it is activated immediately after the tape is loaded in position or reactivated after the source power is once removed or when the tape player is changed from the fast-forwarding or rewinding mode to a play mode, because the device is always activated from the neutral disposition. Since the power gear 1 (FIGS. 1 through 8) in the invention tape player is not locked unless it makes one revolution, the tape slack removing mechanism takes the neutral disposition twice before the tape is actually driven. Therefore, the mechanism can remove a tape slack completely.

Figure 10:
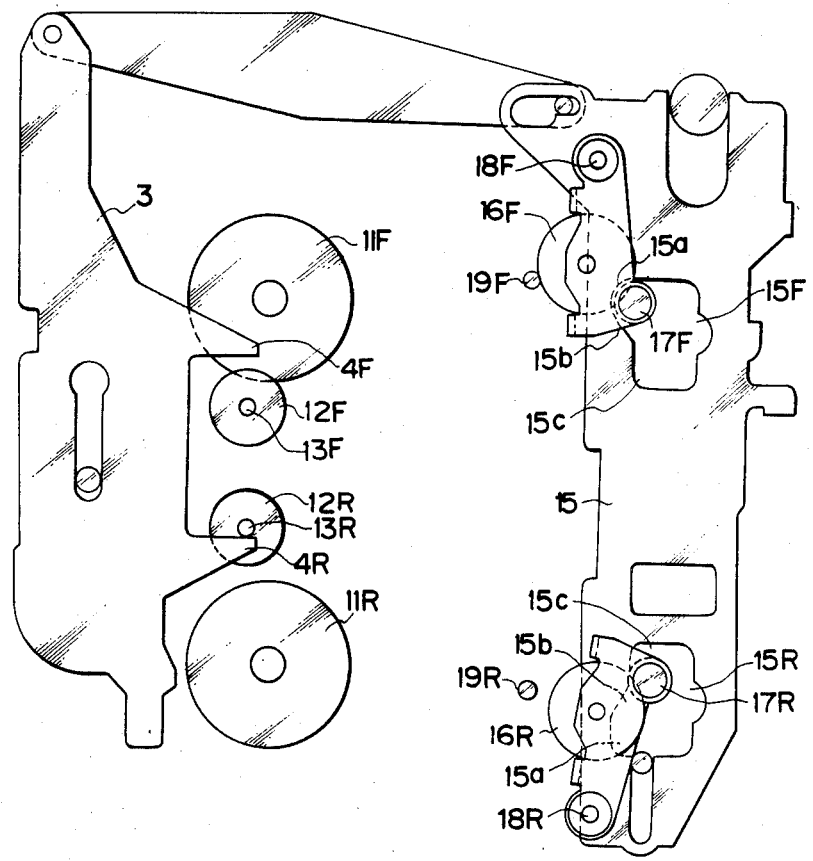

After the tape slack is removed, the pinch roller plate 15 and the power plate 3 are locked at their forward- or reverse-mode positions, the relevant-mode pinch roller forcibly contacts the associated capstan shaft, and the other-mode idler gear is detached from the associated reel base. Thus the tape is driven in the desired mode. More specifically, in driving the tape in the forward direction, see FIG. 10 in which the power plate 3 and the pinch roller change plate 15 take their forward-mode positions, with the projection 14R of the power plate 3 pushing the pin 13R to detach the reverse-drive idler gear 12R from the reel base 11R and with the pin 17F of the forward-drive pinch roller 16F being ported in the pressure contact portion 15a within the cam hole 15F to let the pinch roller 16F forcibly contact the capstan shaft 19F.

The reverse tape driving mode is established in a similar way.

The resilient member (not shown) to keep the power plate 3 in the neutral position is attached to the pinch roller change plate 15. However, it may be attached directly to the power plate 3. The power plate 3 and the pinch roller change plate 15 may be formed in a single body.

As described above, the inventive channel changing mechanism driving system is configured to disengage the power gear from the power plate upon interruption of the power supply. Therefore, when the power supply is interrupted, the necessary displacements of the respective members and the detachment of the pinch roller are achieved in a smooth manner, without applying any load to the motor. Additionally, since the lock link engaging the power plate unlocks the power gear when the power plate takes the neutral position, and also the activation of the power plate following to a throwover of the source power is somewhat delayed, the rotation of the power gear following to the power supply never fails to give the same tape feeding direction as that before the power supply is interrupted.

Further, the tape slack removing mechanism uses the existing mechanism relating to channel changing operation, without requiring a unique, specific construction, and is configured to detach the both pinch rollers from the capstan shafts and bring the both idler gears in pressure contact with the reel bases in the neutral disposition of the mechanism. Regardless of such a simple arrangement, the mechanism completely removes a tape slack and never causes a tape run.

The embodiments of the invention in which an exclusive property or privelege is claimed are defined as follows:

1. A channel changing mechanism in a tape player comprising:

a pinch roller change plate for alternatively bringing a pair of pinch rollers to and away from a pair of capstan shafts;

a power plate operatively linked to said pinch roller change plate to take its forward-mode, reverse-mode and neutral positions;

means for locking said power plate at said forward-mode or reverse-mode position when the source power is supplied to the tape player;

a gear mounted on said power plate and driven by a motor of the tape player;

a power gear mounted on said power plate and having two chipped portions along the geared circumference thereof so as to be intermittently engaged and rotated by said gear;

first engagement means formed in said power plate to engage said power plate with said power gear for establishing reciprocation of said power plate;

resilient means biasing said power gear in its rotatable direction;

a lock link for locking said power gear at an angular position whereat one of said chipped portions is opposed to said motor-driven gear;

said frist engagement means having a release portion to decouple said power plate from said power gear when the power supply is cut off, said power plate having formed a pushing portion for pushing said lock link in a direction to unlock said power gear when said power plate takes its neutral position; and said lock means being configured to delay its action to lock said power plate by a time corresponding to about a half revolution of said power gear after a power-in to the tape player.

2. A channel changing mechanism of claim 1 further including:

forward-drive and reverse-drive reel bases;

two idler gears each engageable with and driving said respective reel base;

second engagement means formed in said power plate;

said second engagement means being configured so that it does not engage either of said idler gears when said power plate takes said neutral position, and it engages one of said idler gears in engagement with said forward-drive or reverse-drive reel base and detaches said idler gear from said reel base when said power plate takes said forward-mode or reverse-mode position.

* * * * *